April 20, 1943.  C. GROEN  2,317,051
MIXING VALVE CONSTRUCTION
Filed Dec. 1, 1941  2 Sheets-Sheet 1
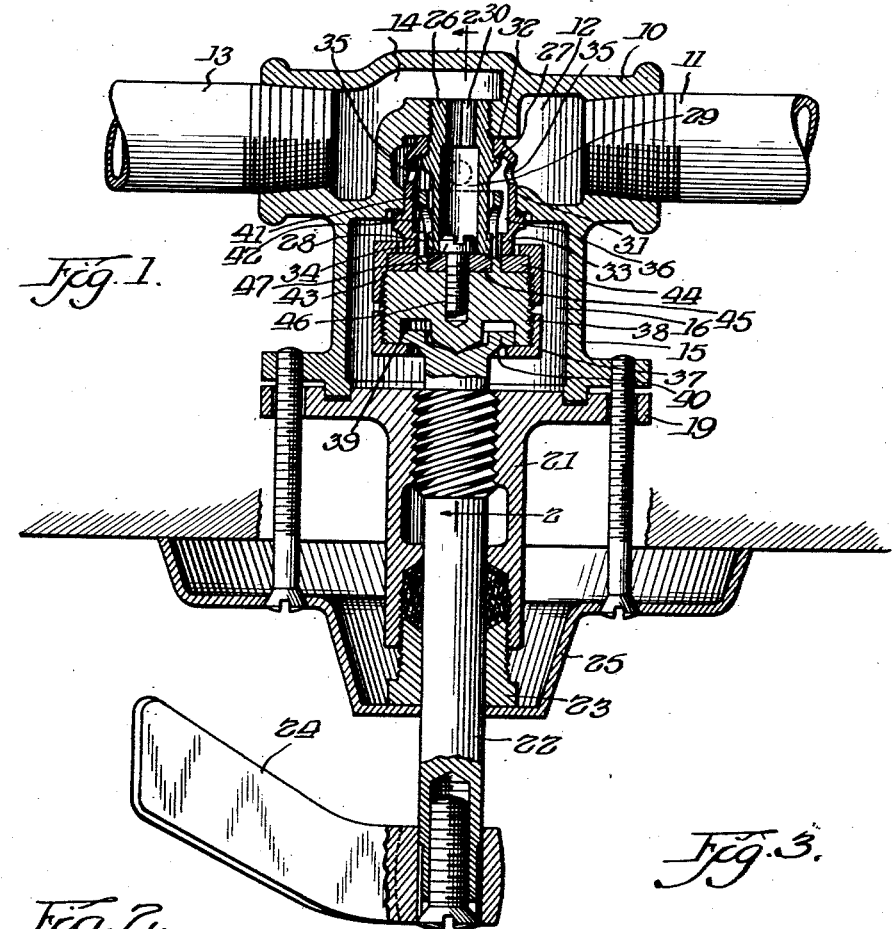
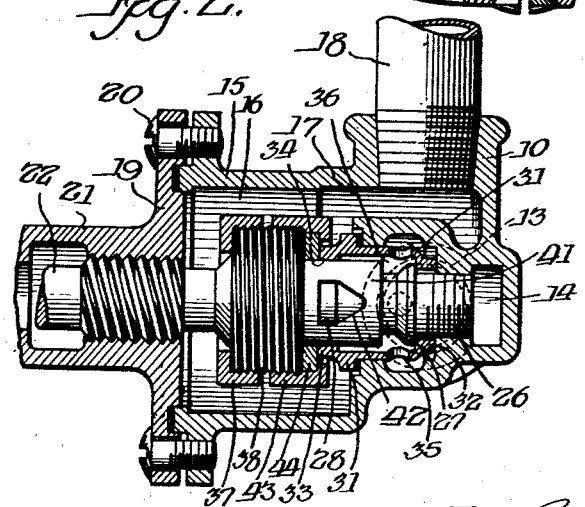
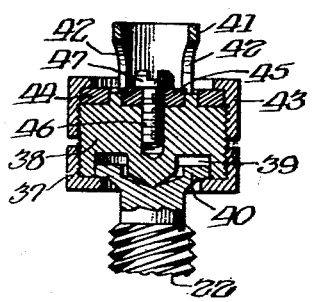
Inventor:
Christopher Groen Inventor:
Christopher Groen Patented Apr. 20, 1943

2,317,051

UNITED STATES PATENT OFFICE 2,317,051

MIXING VALVE CONSTRUCTION

Christopher Groen, Oak Park, Ill., assignor to A. Y. McDonald Mfg. Co., Dubuque, Iowa, a corporation of Iowa Application December 1, 1941, Serial No. 421,087

2 Claims. (Cl. 277—18)

My invention relates to a shower mixing valve and has for its primary object the provision of a valve to regulate the temperature of shower water from cold to hot, with appropriate intermediate temperatures to satisfy the needs of the user.

Another object of my invention is the provision of a mixing valve in which a uniform and thorough mixing of the hot and cold water is secured at a temperature to satisfy the needs of the user, and causing the stream of hot water to pass into the stream of cold water thereby eliminating the hot and cold waves of water at different temperatures now common with showers equipped with the present type of mixing valves.

A further object of my invention is the provision of a mixing valve in which the stream of hot water is passed through streams of cold water in the mixing valve, thus securing a uniform and thorough mixing of the hot and cold water and with no possibility of the failure of the two streams of water to thoroughly commingle, so there is no possibility of a wave of either hot or cold water passing from the shower.

Another and further object is the provision of a mixing valve in which the valve seats in the operated parts can be easily and quickly removed from the mixing valve for purposes of repair or replacement as may be desired.

These and other objects of my invention will be more fully and better understood by reference to the accompanying sheets of drawings, and in which—

Figure 1 is a sectional view of a mixing valve embodying my invention;

Figure 2 is a sectional view on line 2—2 of Figure 1;

Figure 3 is a detailed sectional view showing the swivel head carried by the valve stem forming a part of the invention;

Figure 4:
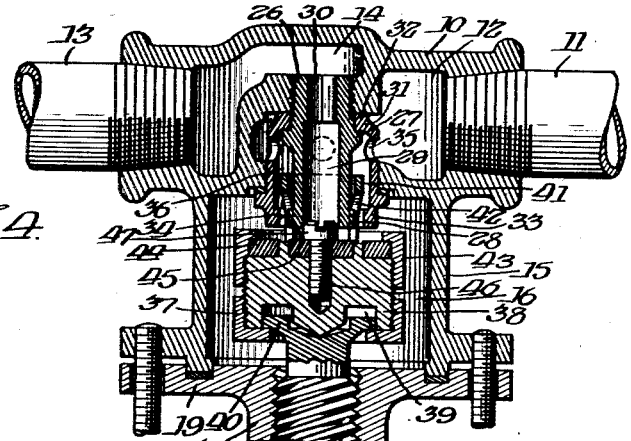
Figure 4 is a detailed sectional view of the mixing valve showing the parts in position for the admission of cold water only to the shower outlet.

Referring now specifically to the drawings, and in which like reference characters refer to like parts throughout, a valve body 10 is shown having a cold water pipe 11 connected thereto leading to a chamber 12 in the valve body 10 for the reception of cold water flowing in through the pipe 11. A pipe 13 leading to any suitable source of hot water is provided on the opposite side of the valve body 10, which discharges into a chamber 14 in the valve body provided for the reception of the hot water discharged through pipe 13. An extension 15 is provided at one side of the valve body 10 having a chamber 16 therein to receive both the hot and cold water or mixtures thereof passing through the valve body 10, which is in communication with a chamber 17 in the valve body 10 and through which the water is discharged into an outlet pipe 18 leading to the usual shower head.

A bonnet 19 is secured to a flange in the extension 15 by screws 20, 20 and has a cylindrical portion 21 therein within which a valve stem 22 is mounted. The valve stem 22 is in threaded engagement with the bonnet 19 so that upon being rotated the valve stem 22 moves in a longitudinal direction with respect to the portion 21, thereby opening and closing the valves as hereinafter described. The usual gland 23 is provided to prevent leakage around the valve stem 22, with a handle 24 being provided by means of which the valve stem is rotated, with the usual wall shield 25 being provided which is secured in the usual position by screws secured at their inner ends to a flange on the extension 15.

Mounted within the valve body 10 and in threaded engagement therewith at its lower end is an inner valve seat 26 having an annular projection 27 extending around the outer periphery thereof and having a flange 28 on the discharge end thereof and having a longitudinal passage or port 29 extending therethrough. The passage 29 is circular throughout a major portion of its length but at its lower portion 30 is substantially square and adapted to receive a wrench or other tool for the purpose of securing the seat 26 in position during the assembling or repair of the mixing valve. A second hollow valve outer seat 31 is mounted in the valve body 10 concentric with the valve seat 26 and having its discharge end in register with the discharge end of the inner seat 26. The lower end 32 of the valve seat 31 is contracted to cooperate with the annular portion 27 on the valve seat 26 so that in effect the valve seat 31 is held in position in the valve body 10 by means of the annular projection 27 of the valve seat 26 engaging the inturned lower portion and, in effect, clamping its lower end firmly against the valve body 10. The valve seat 31 has an annular flange thereon near its upper end under which the usual composition packing is employed which rests upon a partition in the valve body 10. The packing is compressed as the valve seat 31 is screwed into position to form a water-tight joint between the chambers 12 and 16, thereby sealing the cold water chamber 12 from the chamber 16. The seat 31 has an annular inside flange 33 spaced from the outside flange 28 on the valve seat 26, whereby an annular passage 34 is formed between the inner valve seat 26 and the outer valve seat 31 for purposes hereinafter described. It will be noted that the outer valve seat 31 has three internal diameters, the smallest being at the lower end, the largest being intermediate the ends, and the internal diameter at its upper end being only slightly larger than the diameter at the lower end. Ports 35, 35 are provided in the lower end of the outer valve seat 31 which communicate with the cold water chamber 12 in the valve 10, and with a chamber 36 formed between the inner valve seat 26 and the outer valve seat 31 intermediate the ends of these two valve seats.

Mounted upon the inner end of the stem 22 by means of a nut 37 is a swivel head 38. The head 38 has an annular channel 39 formed therein within which a ring 40, on the inner end of the valve stem 22, is adapted to be received, thereby allowing the swivel head 38 to rotate freely with respect to the stem 22 and providing also a slightly loose connection so the head 38 is free to rock so as to insure tight seating upon the valve seats 26 and 31 to prevent the flow of water therethrough when the valve is closed. The lower end of the swivel head 38 has a cylindrical extension 41 thereon. This extension 41 extends into the chamber 36 and passes through the annular passageway 34, and has a thickness substantially equal to the width of the passage 34, with the flanges 28 and 33 forming bearing surfaces for the cylindrical extension member 41. The extension member 41 has oppositely positioned ports 42, 42 therein which are substantially rectangular on one side and triangular at their opposite sides, with the edge of the rectangular portion being in substantial register with the discharge ends of the valve seats 26 and 31, respectively.

Secured to the lower end of the swivel head 38 by means of a nut 43 is a washer 44, this washer being positioned adjacent the outside of the cylindrical extension 41 and against the face of the swivel head 38, and normally is adapted to engage the outer valve seat 31. Another washer 45 is provided which is held in position against the lower face of the swivel head 38 inside of the extension 41 by means of a screw 46 having a head 47 thereon of substantially the same external diameter as the internal diameter of the chamber 29, the washer 45 and the head 47 performing the function normally of closure and control members for the hot water passing through the internal bore of the inner valve seat 26, which in turn is controlled by the operator by means of the handle 24, and the valve stem 22.

In assembling this structure, the inner and outer valve seats 26 and 31, respectively, are placed in position one inside the other, and the inner valve seat 26 by means of a wrench or other suitable tool is screwed down tightly into engagement with the main body 10 of the valve, thereby positioning itself in the body 10 and holding the outer valve seat 31 in aligned proper concentric relation with the inner seat 26. The swivel head 38 can then be inserted in the chamber formed by the extension 15, the swivel head, valve stem, washers and the like, having been previously assembled in normal order, the bonnet 19 secured to the extension 15 by the screws 20, 20, and the shield 25 attached so that the valve is ready to be mounted in position upon a wall.

Figure 5:
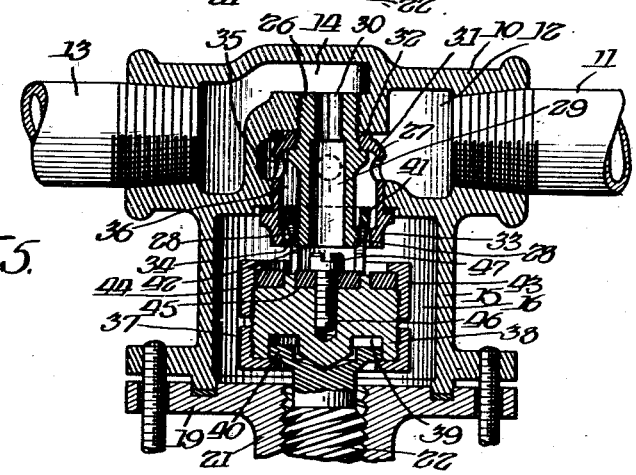
Figure 5 is a sectional view showing the operating parts in position to admit a mixture of hot and cold water to the shower outlet.
Figure 6:
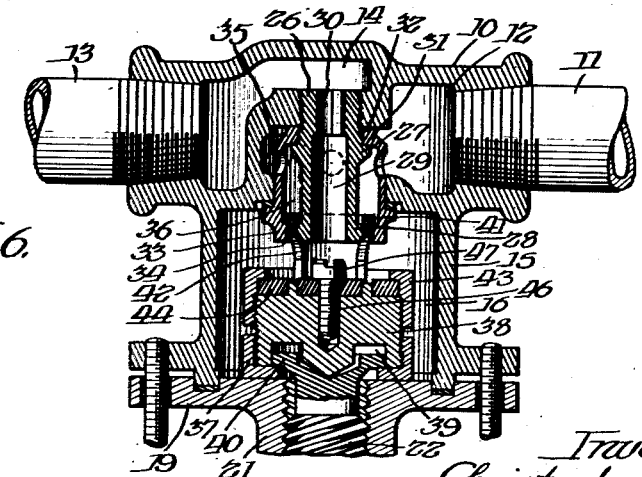
Figure 6 is a detailed sectional view showing the various parts in position to admit only hot water to the shower outlet.

In operation of the valve, the operator grasps the handle 24 and turns the valve stem 22 in a direction to open the valve, thereby moving the head 38 and the washers 44 and 45 a short distance away from the seats 26 and 31. In this position (Fig. 4) the cold water passes from the chamber 36 through the ports 42, over the end of the outer seat 31 and into the chamber 16 to the shower outlet, so that only cold water will be supplied to the shower outlet upon the initial and slight opening of the valve and during the continued turning of the valve stem in a valve opening direction until the swivel head 38 is moved a sufficient distance so the head 47 on the screw 46 is moved out of the passage 29. The maximum supply of cold water to the shower outlet is reached just as the head 47 is in position to leave the passage 29. At this point hot water will begin to flow from the passage 29 and through the ports 42 out into the chamber 16 and become commingled and mixed with the cold water because it passes into the streams of cold water from the inside and moves in the direction of flow into the chamber 16 as it passes through the ports 42 (Fig. 5). Further movement of the swivel head outward by rotation of the stem 22 moves the upper portion of the ports 42 into more direct alignment with the flow of the hot water and because of the triangular shape of these ports at the lower end the flow of cold water therethrough is decreased until, when the stem 22 is moved to the limit of its outer direction of travel, the cold water flow is shut off entirely and only hot water can flow out into the shower outlet.

Upon the shower being closed off, the reverse operation takes place. As the valve is closed, first hot water is shut off and then the flow of cold water is increased until finally the valve is closed, stopping the flow of both hot and cold water through the valve. It will thus be understood that by the operator adjusting the valve to the proper position he desires, either cold water is supplied to the shower or only hot water, and that in between these two ranges, by the proper adjustment of the handle, any desired mixture of water can be obtained. Because the hot water must flow through the cold water before reaching the shower outlet, the water becomes thoroughly mixed and there is no chance of obtaining a surge or wave of either hot or cold water, a common fault of many of the mixing valves in operation at the present time.

Should it become necessary at any time to repair or replace the seats in the valve, the stem can be readily removed by removing the screws 20 and taking the bonnet 19 from the valve, whereupon new washers 44 or 45 can be applied. If desired, a tool can be inserted into the squared lower end of the inner valve seat 26 and these valve seats removed and replaced with others should the mixing valve leak or should it become necessary to replace or repair any of the parts thereof. Therefore the valve at all times can be easily assembled and disassembled both in the original installation and manufacture thereof, and for purposes of repair after the valve has been in service, should such repair become necessary.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of the appended claims.

What is claimed is:

1. A mixing valve comprising a body having hot and cold water receiving chambers therein and having a discharge chamber, an inner valve seat having a passage longitudinally thereof which connects the hot water receiving chamber and the discharge chamber in said valve body, an outer cylindrical valve seat in concentric arrangement with said inner seat having inlet ports communicating with the said cold water receiving chamber, the said outer valve seat being in spaced relation with said inner seat throughout a substantial portion of its length whereby a water-receiving passage is formed between said seats, the outer valve seat having an internal flange adjacent its free end and the inner valve seat having an external flange therearound on its free end, the said flanges being spaced apart whereby an annular discharge passage is formed between the two valve seats at the ends thereof, a valve member in the discharge chamber having a cylindrical extension thereon which extends into said discharge orifice between the valve seats at the ends thereof and in sliding engagement with the opposed faces of the valve seats defining the discharge orifice, the said extension having openings in its side walls, a member on said valve member extending into the longitudinally extending passage in said inner valve member, and means whereby the said valve member is moved into and out of engagement with the said valve seats.

2. A mixing valve comprising a body having hot and cold water receiving chambers therein and having a discharge chamber, an inner valve seat having a passage longitudinally thereof which connects the hot water receiving chamber and the discharge chamber in said valve body, an outer cylindrical valve seat in concentric arrangement with said inner seat having inlet ports communicating with the said cold water receiving chamber, the said outer valve seat being in spaced relation with said inner seat throughout a substantial portion of its length whereby a water-receiving passage is formed between said seats, the outer valve seat having an internal flange adjacent its free end and the inner valve seat having an external flange therearound on its free end, the said flanges being spaced apart whereby an annular discharge passage is formed between the two valve seats at the ends thereof, a valve member in the discharge chamber having a cylindrical extension thereon which extends into said discharge orifice between the valve seats at the ends thereof, the said extension having openings in its side walls, the thickness of the wall of the extension member being substantially equal to the width of the discharge passage at the ends of the valve seats, a member on said valve member extending into the longitudinally extending passage in said inner valve member, and means whereby the said valve member is moved into and out of engagement with the said valve seats.

CHRISTOPHER GROEN.